(12) United States Patent
Ying et al.

(10) Patent No.: US 8,934,889 B2
(45) Date of Patent: Jan. 13, 2015

(54) STANDARDIZED CONTROL OF WIRELESS DEVICES

(71) Applicant: AT&T Intellectual Property I, L.P., Atlanta, GA (US)

(72) Inventors: Goangshiuan Shawn Ying, Oakland, CA (US); Stephen Michael Aspell, Brentwood, CA (US); Eugene Lane Edmon, Danville, CA (US); Huizhen Chen, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/963,828

(22) Filed: Aug. 9, 2013

(65) Prior Publication Data

US 2013/0324103 A1    Dec. 5, 2013

Related U.S. Application Data

(63) Continuation of application No. 11/925,497, filed on Oct. 26, 2007, now Pat. No. 8,509,760.

(51) Int. Cl.
| | |
|---|---|
| *H04M 3/00* | (2006.01) |
| *H04W 4/00* | (2009.01) |
| *H04M 1/725* | (2006.01) |

(52) U.S. Cl.
CPC .......... *H04W 4/001* (2013.01); *H04M 1/72525* (2013.01); *H04M 2250/52* (2013.01)
USPC ......................................... 455/419; 455/418

(58) Field of Classification Search
CPC . H04W 4/12; H04W 88/085; H04W 52/0225; H04W 88/02; H04W 52/0235; H04W 52/0274; H04L 1/0066; H04L 51/04; H04L 51/22; H04L 67/125; H04L 65/1069; H04M 1/72522; H04M 1/66; H04M 1/72572; G06F 21/305; G06F 21/88; G06F 21/62; H04B 10/25754; H04B 7/26
USPC .................................................. 455/418, 419
See application file for complete search history.

(56) References Cited

U.S. PATENT DOCUMENTS

| | | | |
|---|---|---|---|
| 5,995,829 | A  | 11/1999 | Broderick |
| 6,047,071 | A  |  4/2000 | Shah |
| 6,144,849 | A  | 11/2000 | Nodoushani et al. |
| 6,480,710 | B1 | 11/2002 | Laybourn et al. |
| 6,529,729 | B1 |  3/2003 | Nodoushani et al. |
| 6,532,362 | B1 |  3/2003 | Lee et al. |
| 6,611,913 | B1 |  8/2003 | Carroll et al. |
| 6,625,439 | B2 |  9/2003 | Laybourn et al. |
| 7,043,263 | B2 |  5/2006 | Kaplan et al. |

(Continued)

*Primary Examiner* — Olumide T Ajibade Akonai
*Assistant Examiner* — Edward Zhang
(74) *Attorney, Agent, or Firm* — Jackson Walker L.L.P.

(57) ABSTRACT

A disclosed service for managing mobile and wireless communication devices (MWCDs) includes enabling a server to generate a standard remote configuration command (RCC) and enabling a transmitter coupled to the server to transmit the RCC wirelessly. The RCC configures a feature on a first MWCD of a first supplier and a second MWCD of a second supplier. The RCC may disable one or more of a set of selected MWCD peripheral devices. For example, the RCC may disable an MWCD camera, an MWCD microphone, and/or an MWCD speaker. In some embodiments, the RCC transitions the MWCD to a restricted state in which the MWCD is unable to record multimedia content including audio and video content. In these embodiments, the RCC may configure one or more of the features on each of a set of MWCDs within a defined geographic region.

20 Claims, 5 Drawing Sheets

(56) References Cited

U.S. PATENT DOCUMENTS

| | | |
|---|---|---|
| 7,146,159 B1 | 12/2006 | Zhu |
| 7,165,173 B1 | 1/2007 | Herle |
| 7,236,783 B2 | 6/2007 | Gould |
| 7,266,369 B2 | 9/2007 | Moles et al. |
| 7,558,564 B2 | 7/2009 | Wesby |
| 2003/0008634 A1 | 1/2003 | Laybourn et al. |
| 2003/0162533 A1 | 8/2003 | Moles et al. |
| 2003/0210657 A1 | 11/2003 | Mahajan |
| 2003/0212991 A1 | 11/2003 | Mahajan |
| 2004/0009760 A1 | 1/2004 | Laybourn et al. |
| 2004/0029574 A1 | 2/2004 | Mazzara, Jr. |
| 2004/0203941 A1 | 10/2004 | Kaplan et al. |
| 2004/0204054 A1 | 10/2004 | Lee |
| 2005/0064914 A1 | 3/2005 | Gough |
| 2005/0101305 A1 | 5/2005 | Natarajan |
| 2005/0164680 A1 | 7/2005 | Gould |
| 2005/0172281 A1 | 8/2005 | Goring et al. |
| 2005/0172295 A1 | 8/2005 | Goring et al. |
| 2005/0233693 A1 | 10/2005 | Karaoguz et al. |
| 2006/0121887 A1 | 6/2006 | Chilukoor |
| 2006/0140144 A1 | 6/2006 | Bruner et al. |
| 2006/0195517 A1 | 8/2006 | Kaplan et al. |
| 2006/0203722 A1 | 9/2006 | Oommen |
| 2006/0222009 A1 | 10/2006 | Yao et al. |
| 2006/0223553 A1 | 10/2006 | Reisgies |
| 2007/0049265 A1 | 3/2007 | Kaimal et al. |
| 2007/0072598 A1 | 3/2007 | Coleman et al. |
| 2007/0105542 A1 | 5/2007 | Friedman |
| 2007/0117558 A1 | 5/2007 | Balwani |
| 2007/0154004 A1 | 7/2007 | Daigle |
| 2007/0155420 A1 | 7/2007 | Nagaraj et al. |
| 2008/0013471 A1 | 1/2008 | Kim |
| 2008/0167002 A1 | 7/2008 | Kim et al. |

STANDARDIZED CONTROL OF WIRELESS DEVICES

The present patent application is a continuation of U.S. patent application Ser. No. 11/925,497, filed Oct. 26, 2007, the entirety of which is hereby incorporated by reference.

BACKGROUND

1. Field of the Disclosure

The present disclosure relates to wireless communication devices.

2. Description of the Related Art

Many wireless communication devices include functionality to record audio content, motion video, and/or still video (image) for distribution or playback. This functionality is operable regardless of whether the recorded content contains information that is confidential and/or protectable under copyright or other laws. In addition, substantially all wireless communication devices are susceptible to generating audibly detectable signals in response to scheduled and unscheduled events including incoming communications or calendar reminders. These audibly detectable signals have the potential to cause annoying and embarrassing disturbances depending upon when and where the signal is generated.

DESCRIPTION OF THE EMBODIMENT(S)

Figure 1:
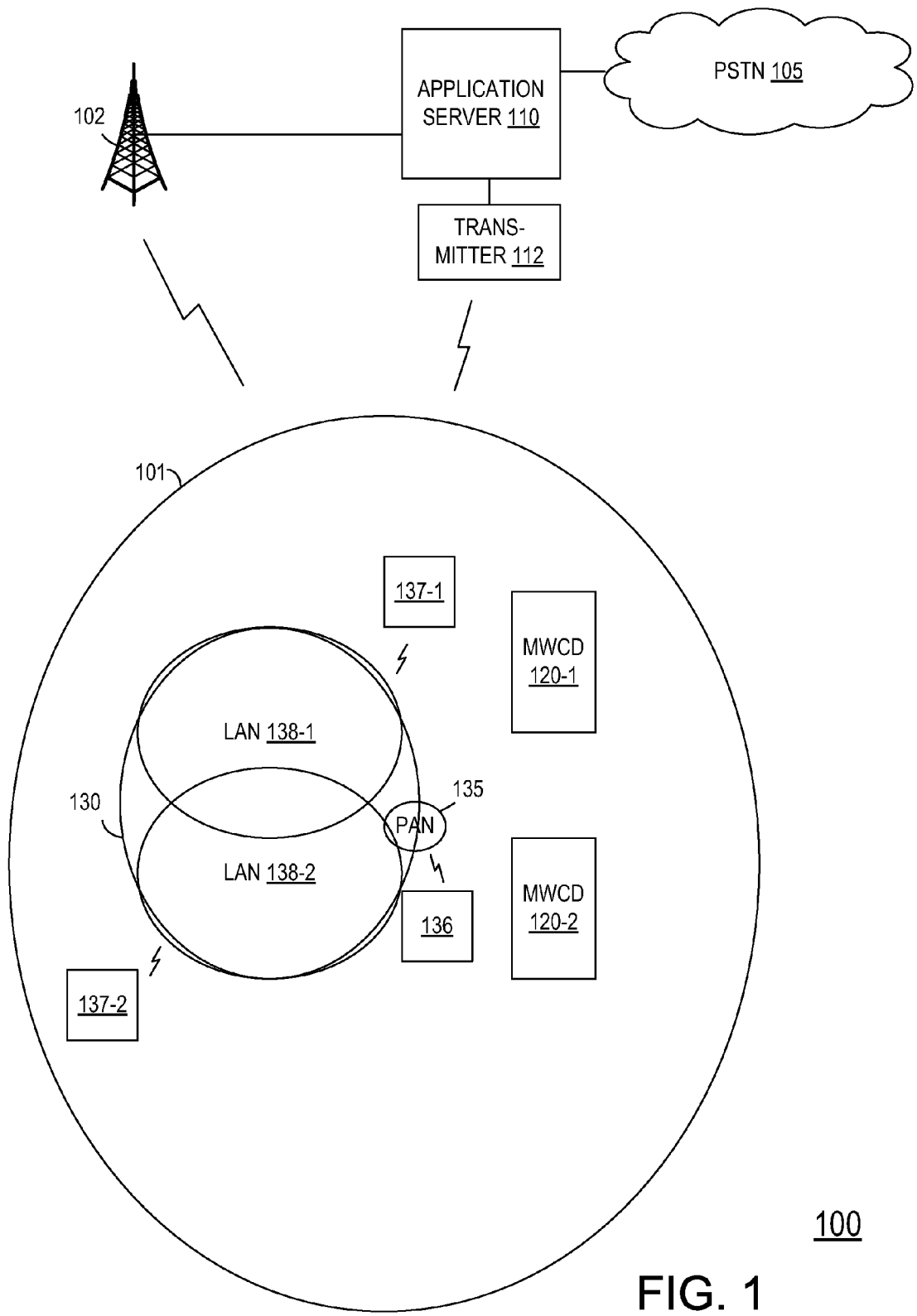
FIG. 1 is an illustration of a telecommunications network.

In one aspect, a disclosed service for managing telephony-based mobile and wireless communication devices (MWCDs) includes enabling a server to generate a standard remote configuration command (RCC) and enabling a transmitter operably coupled to the server to transmit the RCC wirelessly. The RCC configures a feature on a first MWCD of a first supplier and a second MWCD of a second supplier. The RCC may disable one or more of a set of selected MWCD peripheral devices. For example, the RCC may disable an MWCD camera, an MWCD microphone, and/or an MWCD speaker. In some embodiments, the RCC transitions the MWCD to a restricted state in which the MWCD is unable to record multimedia content, including audio and video content. In these embodiments, the RCC may configure one or more of the features on each of a set of MWCDs within a defined geographic region. The RCC may configure the feature(s) on each MWCD with a defined geographic region that has accepted an invitation from the server. The server may also be operable to generate a second RCC to power down MWCDs that have not accepted the invitation. The transmitter may be configured to transmit the RCC using a personal area network protocol, e.g., Bluetooth. The RCC may also be enabled using a digital cellular technology.

In another aspect, a disclosed MWCD includes a processor coupled to a storage resource, a wireless module coupled to the processor, and one or more peripheral devices coupled to the processor. The peripheral devices may include a speaker to produce sound, a microphone to convert sound to an audio signal, a camera to convert still or motion images to a video signal. The MWCD may further include an audio recording module and a video recording module. The audio recording module receives audio signals from the microphone and stores information indicative of the audio signal in the storage resource. Similarly, the video recording module receives still or motion video signals from the camera and stores information indicative of the video signal in the storage resource.

The MWCD storage resource includes a remote configuration module. The module may be implemented as computer executable instructions, stored in the storage resource, for responding to a set of RCCs received via the wireless module. At least one of the RCCs may include a restricted state command that transitions the MWCD to a restricted state in which the MWCD is inoperable to record audio or video data. The MWCD may be unable or inoperable to output an audibly detectable signal in the restricted state. The remote configuration module may also support the concept of authorization by, for example, including an authorization module enabling the MWCD to permit or prevent execution of the restricted state command. In these embodiments, the authorization module enables the MWCD to respond to a power down RCC when the MWCD prevents execution of the restricted state command. The wireless module may be able to receive RCCs transmitted via an "open" portion of the radio frequency (RF) spectrum, e.g., via an IEEE 802.15 family or personal area network (PAN) protocol including, as examples, Bluetooth and ZigBee, or an IEEE 801.11 family protocol (WiFi), or another suitable 2.4 GHz protocol.

In still another aspect, a disclosed server includes functionality to manage a set of MWCDs. The server includes a processor and a storage resource accessible to the processor. The storage resource includes embedded instructions executable by the processor. The instructions, when executed, generate an RCC that, when received by an MWCD, configure a feature of the MWCD. The RCC may be transmitted wirelessly to at least a first MWCD and a second MWCD to configure the feature of the first and second MWCDs. The first and second MWCDs may be manufactured by different MWCD vendors, may operate on different cellular communication protocols, and may employ different encryption algorithms or keys.

In still another aspect, a disclosed service includes enabling a telephony-based MWCD to receive a multicast signal transmitted from a remote server and enabling the MWCD to respond to reception of the multicast signal by transitioning the MWCD to an operational state for use in a multimedia performance environment. The MWCD is unable to record the performance in the operational state.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 102-1 refers to an instance of a widget class, which may be referred to collectively as widgets 102 and any one of which may be referred to generically as a widget 102.

Before describing details of applications, disclosed herein, for use in conjunction with an MWCD network, selected aspects of one embodiment of the network and selected devices used to implement the network are described to provide context.

FIG. 1 is a block diagram of selected portions of an embodiment of an MWCD network 100. MWCD network 100 supports and employs the use of one or more standardized RCCs. In some embodiments, the standardized RCCs are useful in transitioning one or more MWCDs to a desired operational state. For example, it may be desirable to transition all MWCDs that are present at an artistic or other form of multimedia performance or presentation to a known operational state. For example, it may be desirable to transition all MWCDs at a performance to prevent the MWCD subscriber or user from recording the audio and/or video content of the performance. The ability to control the operational state of all mobile wireless devices having multimedia recording capability that are present at a multimedia performance beneficially improves the ability of the artist or author(s) of the performance from infringing any copyrights associated with the performance. In settings where copyright considerations may be secondary to considerations of security and/or confidentiality, the disclosed functionality is equally useful for preventing unauthorized recording of confidential information.

In the implementation shown in FIG. 1, MWCD network 100 includes a cellular base station 102, represented by a transmission tower, that is associated with a cell 101. Cell 101 may represent the geographic region served by cellular base station 102. The size and location of precise boundaries of cell 101 is an implementation detail. Cells 101 in rural areas, for example, may be larger than cells 101 in urban areas. Cells 101 may have generally circular perimeters or they may have other shapes depending upon a wide variety of factors.

Cellular base station 102 is shown as connected to an application server 110. Application server 110 may connect cellular base station 102 to the public switched telephone network (PSTN) 105 as shown in FIG. 1. In other embodiments, application server 110 may be separate from a device that switches or connects cellular base station 102 to PSTN 105. Application server 110 is enabled to generate RCCs that configure the multimedia recording functionality of MWCDs in restricted function zone 130. Application server 110 may be further enabled to generate other types of RCCs including, as an example, an RCC to transition an MWCD to a "silent state" in which a speaker device of the MWCD is disabled so that the MWCD does not ring or make other audibly detectable sounds.

The application server 110 as shown in FIG. 1 is enabled to transmit wirelessly the RCC that it generated. In some embodiments, wireless transmission of an RCC by application server 110 may occur using an open or non-private portion of the RF spectrum. Currently, wireless transmission protocols that operate in open portions of the RF spectrum include, as examples, IEEE 802.15 or PAN protocols and IEEE 802.11 or WiFi protocols.

In other embodiments, RCCs may be transmitted over private portions of the RF spectrum in cooperation with the authorized owners or licensees of the applicable spectrum. Thus, for example, RCCs may be transmitted via a cellular protocol either from base station 102 or directly from the application server 110.

Utilizing open portions of the RF spectrum to transmit RCCs beneficially facilitates the implementation of an RCC standard that might be supported by all MWCDs regardless of the cellular technology employed by the MWCDs. On the other hand, transmitting RCCs via a cellular protocol would enable the implementation of RCCs on MWCDs that do not include adapters for any "open wireless" protocols such as any PAN or WiFi.

In some embodiments, application server 110 includes or is operatively connected to a wireless transmitter 112 for direct transmission of RCCs to MWCDs 120 in cell 101 generally or to MWCDs 120 in restricted function zone 130 within cell 101. In some embodiments, RCCs are transmitted by wirelessly multicast to some or all of a set of MWCDs within a definable geographical area such as within restricted function zone 130.

Complementing the RCC functionality of application server 110, MWCDs 120 of FIG. 1 include functionality to receive and respond to an RCC transmitted by application server 110. In some embodiments, MWCDs 120, regardless of supplier or service provider, are operable to recognize RCCs from application server 110 and respond to them by executing the RCCs internally to alter the configuration of MWCD 120.

FIG. 1 depicts, within cell 101, a plurality of MWCDs, two of which are explicitly identified as MWCD 120-1 and 120-2, are located. In some embodiments, MWCD 120-1 and MCWD 120-2 may be subscribed to cellular services provided by different service providers, manufactured by different suppliers, operate on different cellular communication protocols, or different from each other in other ways. For example, first MWCD 120-1 may be manufactured by a first supplier using a first set of hardware and firmware, distributed by a first service provider, and operating on a first wireless communication protocol while second MWCD 120-2 may be manufactured by a second supplier using a second set of hardware and firmware, distributed by a second service provider and operating on a second wireless communication protocol. In such an embodiment, first and second MWCDs 120-1 and 120-2 may, nevertheless, both recognize one or more standardized RCCs.

Thus, some embodiments of MWCD network 100 are suitable for use in conjunction with a defined set of one or more standard RCCs. Standard RCCs may be desirable to configure the feature set for a disparate set of MWCDs. In some embodiments, the features configured by one or more RCCs include features that extend the functionality of MWCDs 120 beyond telephony applications.

As discussed below, some embodiments of MWCDs 120 include resources or features that enable the MWCDs to record audio and or video content including music and other audio content as well as still and moving images. When patrons enter a building or outdoor location to witness a performance of a multimedia presentation, it may be desirable to prevent the patrons from making their own recordings of such performances. Historically, it has been feasible to control multimedia recording by controlling the types of devices patrons were permitted to bring to the performance. With the advent of telephony devices including cellular telephones and personal data administrators (PDAs) of increasingly smaller size and supporting increasingly more features and peripheral devices, it is difficult to prevent attendees from having access to recording devices during a multimedia performance.

In some aspects, the disclosed network and devices support and implement a standard set of RCCs that enable a producer of a multimedia performance to control the recording capabilities to which its audience members have access. In addition, analogous functionality may be leveraged as disclosed herein to further control the use of MWCDs during multimedia performances by disabling, for example, the ability of an MWCD to ring, beep, or otherwise make an audibly detectable output.

MWCD network 100 as shown in FIG. 1, further illustrates a restricted function zone 130 within cell 101. Restricted function zone 130 represents a physical or geographical area or region within which standard RCCs may be employed to configure any number of technically similar or technically disparate MWCDs 120. As discussed above, the manner in which RCCs is transmitted to MWCDs may vary depending upon a variety of factors.

In some embodiments, for example, RCCs may be transmitted via a PAN 135 defined by a PAN access point 136. PAN 135 is a highly localized network having a range of a few meters or less. In an implementation of PAN 135, application server 110 may communicate an RCC to a PAN access point 136 via a wireless or wireline transmission medium. PAN access point 136 may then transmit the RCC within PAN 135. The patrons and/or other attendees to a multimedia performance would be restricted in their ingress to the performance so that each patron would be required to pass through a defined PAN 135, only one of which is shown in FIG. 1, before entering the performance. As the patron enters PAN 135, RCCs transmitted by PAN access point 136 may be detected by the patron's MWCD.

In other embodiments, RCCs may be communicated via a wireless protocol having a greater range than PAN 135. As referenced earlier, for example, an RCC may be transmitted via a WiFi protocol or another suitable digital wireless (LAN) protocol. As depicted in FIG. 1, for example, a set of one or more LAN access points including LAN access points 137-1 and 137-2, define corresponding LANs 138-1 and 138-2. One or more of LAN access points 137 are operably connected for communicating with application server 110 to receive RCCs one or more RCCs. In this embodiment, the LAN access points 137 may define a LAN "mesh" that covers all or a substantial portion of restricted function region 130. MWCDs that are located anywhere within LANs 138 may receive and respond to RCCs. In still other embodiments, an RCC may be transmitted by cellular base station 102 using a suitable cellular protocol. In these embodiments, it may be desirable or necessary to differentiate between MWCDs within cell 101 that are within the restricted function zone 130 from MWCDs within cell 101 that are not within restricted function zone 130. Known techniques for determining the physical location of an MWCD may be used, including, as an example, geographic triangulation techniques.

Figure 2:
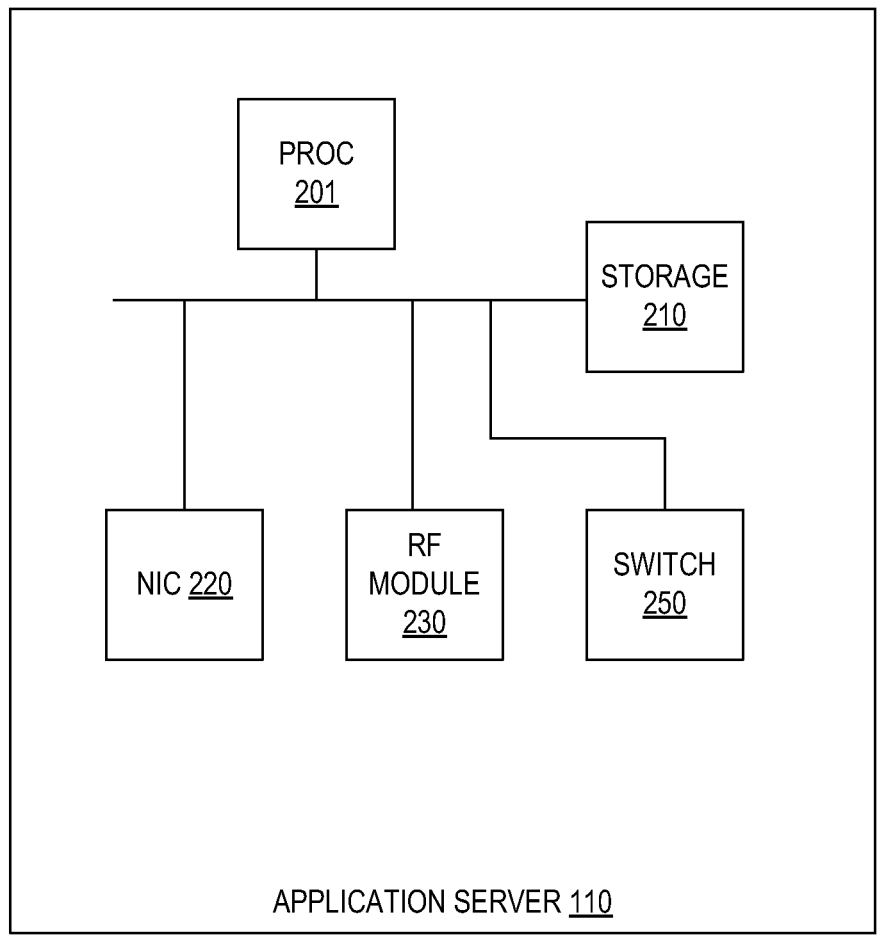
FIG. 2 is a block diagram of an embodiment of an application server suitable for use in the network of FIG. 1.
Figure 3:
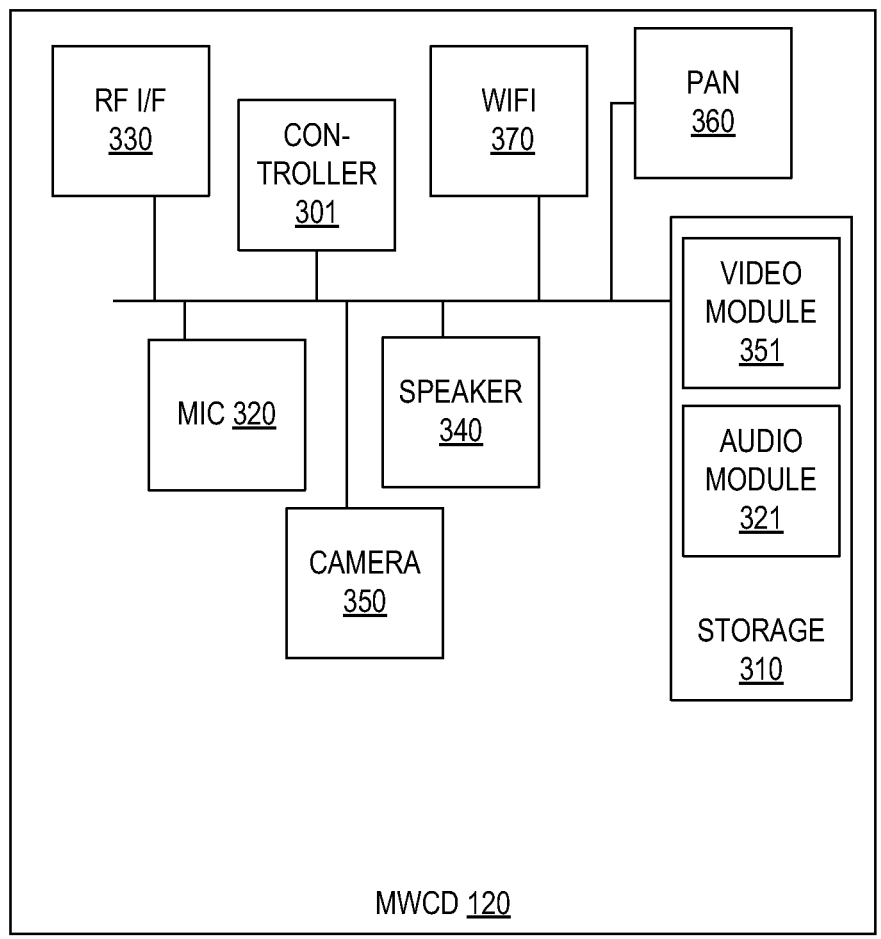
FIG. 3 is a block diagram of an embodiment of a mobile and wireless communication device suitable for use in the network of FIG. 1.

Turning now to FIG. 2 and FIG. 3, selected portions of embodiments of the application server 110 and the MWCD 120 as shown FIG. 1 are presented. In the embodiment depicted in FIG. 2, application server 110 includes a processor 201 having access to a storage resource 210. Storage resource 210 encompasses various combinations of volatile or non-volatile memory including random access memory (RAM) and flash memory, as well as magnetic and/or optical disk-based storage. Application server 110 as shown in FIG. 2 further includes a base station switch 250 for connecting application server 110 to a wireless base station. Application server 110 may further include a radio frequency (RF) module 230 for communicating directly with an MWCD using a cellular protocol and a wireline or wireless network interface communication adapter (NIC) 220 capable of communication via a wireline or wireless local area network (LAN) such as an Ethernet, WiFi, PAN or other suitable communication protocol. NIC 220 may support a wireless or wireline connection between application server 110 and PAN access point(s) 136 and/or wireless LAN access point(s) 137.

In the embodiment depicted in FIG. 3, MWCD 120 includes a controller 301 having access to a storage resource 310. Storage resource 310 encompasses volatile and nonvolatile memory devices as well as a magnetic and/or optical disk storage medium. MWCD 120 as shown in FIG. 3 further includes various interface and peripheral devices connected to controller 301. In the depicted embodiment, for example, MWCD 120 includes a microphone 320, a digital camera 350, and a speaker 340. In addition, MWCD 120 includes an RF interface 330, a PAN interface 360, and a WiFi interface 370.

RF interface 330 is operable to communicate information with cellular base station 102 via a cellular telephone protocol. In embodiments employing an RF interface 330, MWCD 120 may be referred to as a telephony-based device to emphasize its telephony functionality. The cellular telephone protocol used by MWCD 120 is an implementation decision and MWCD 120 may support any of a variety of cellular protocols including second generation (2G) and third generation (3G) code division multiple access (CDMA) technologies and time division multiple access (TDMA) protocols. Similarly, PAN interface 360 supports communication via a Bluetooth or other form of personal network protocol that supports wireless local area network communication.

MWCD 120 as shown in FIG. 3 includes an audio module 321 and a video module 351. Audio module 321 as shown is implemented as a set of computer executable instructions stored in storage 310, i.e., software. In other embodiments, audio module 321 may include dedicated hardware, firmware, software, or a combination thereof. Audio module 321 includes functionality that supports the recording of audio content by processing and storing audio signals from microphone 320. Processing performed by audio module 321 may include modulation and/or demodulation, encryption and/or decryption, analog/digital conversions, and compression.

Audio module 351 as shown is implemented as a set of computer executable instructions stored in storage 310, i.e., software. In other embodiments, video module 351 may include dedicated hardware, firmware, software, or a combination thereof. Video module 351 includes functionality that supports the recording of video content by processing and storing video signals from camera 320. Video module 351 is preferably operable to record both still and motion video images. Like audio processing module 351, processing performed by video module 321 may include modulation and/or demodulation, encryption and/or decryption, analog/digital conversions, and compression.

MWCD 120 may be packaged in a handheld chassis that is operable to receive a battery or other source of DC power. MWCD 120 may further include a keypad and keypad interface (not depicted) and a liquid crystal or other form of display screen (not depicted).

In some embodiments, the disclosed techniques for controlling the recording functionality of a set of MWCDs employ one or more computer program products. A computer program product is a computer readable storage medium, e.g., storage resources 210 and 310, on which are stored or in which are embedded a set or sequence of computer executable instructions for controlling the recording functionality and other features of a set of MWCDs.

Figure 4:
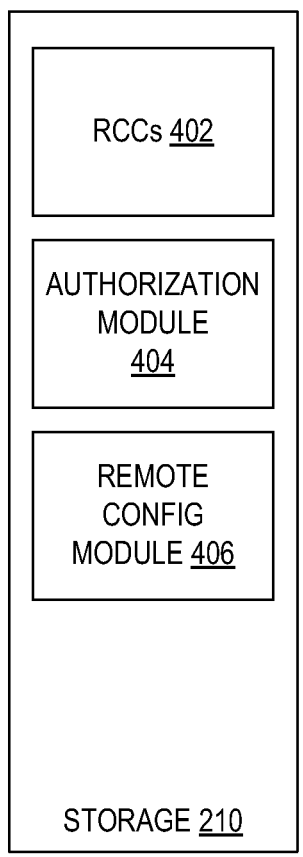
FIG. 4 is a conceptual illustration of selected software modules stored in a storage resource of the application server depicted in FIG. 1.
Figure 5:
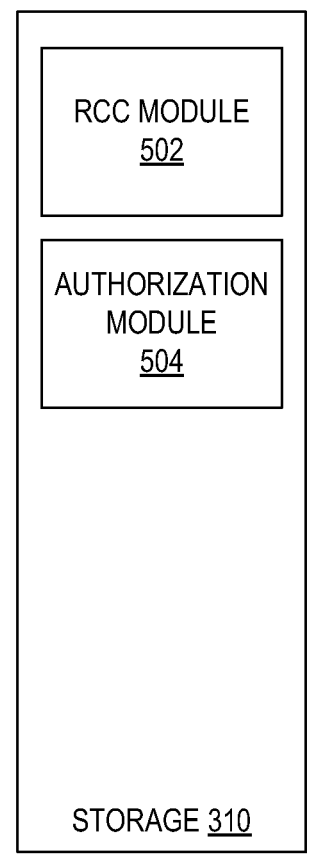
FIG. 5 is a conceptual illustration of selected software modules stored in a storage resource of the mobile and wireless communication device depicted in FIG. 1.

Referring now to FIG. 4 and FIG. 5, conceptual illustrations of embodiments of software code stored in the storage resource 210 of application server 110 and storage resource 310 of MWCD 120 are presented. In the depicted illustrations, storage resource 210 includes a remote configuration module 406, an authorization module 404, and a set of standardized RCCs 402. The RCCs 402 are operable, when executed, to control or configure the user settings or features on an MWCD 120. RCCs 402 may be compliant with a standardized set of RCCs defined by an industry group or another standards-setting body. RCCs 402, in some embodiments, include one or more RCCs for configuring the operational state of a set of MWCDs. The RCCs may include a standard instruction or set of instructions for configuring MWCD 120 by transition MWCD 120 from an current operating state to a restricted operating state. In some embodiments, the restricted operating state refers to an operation state in which MWCD 120 is inoperable to record multimedia content. The restricted state might, alternatively or additionally, refer to an operational state in which MWCD 120 is prevented from generating audibly detectable sounds including rings, ring tones, beeps, alarms, and the like.

Similarly, the depicted embodiment of MWCD storage resource 310 is shown as including an RCC module 502. In some embodiments, RCC module 502 represents a module that interprets and executes RCC commands generated by application server 110. RCC module 502 may, for example, include an RCC for disabling any or all of the peripheral devices of MWCD 120 including microphone 320, camera 350, and speaker 340. In some embodiments, RCC module 502 may include a sequence of instructions operable when executed to cause MWCD 120 to transition from a current operational state to the restricted operational state when the MWCD 120 is physically located within restricted function zone 130 in cell 101.

The RCCs defined in RCCs 402 and recognized by RCC module 502 may include an RCC to disable video recording, an RCC to disable audio recording, and an RCC to disable audibly detectable signals. The audio disabling RCC may operate by disabling microphone 320, disabling audio module 321, or both. Disabling audio recording functionality by disabling audio module 321 would enable continued functionality of microphone 320 for other purposes including telephone purposes. Similarly, disabling video recording functionality may be achieved by disabling video module 351, camera 350, or both.

Figure 6:
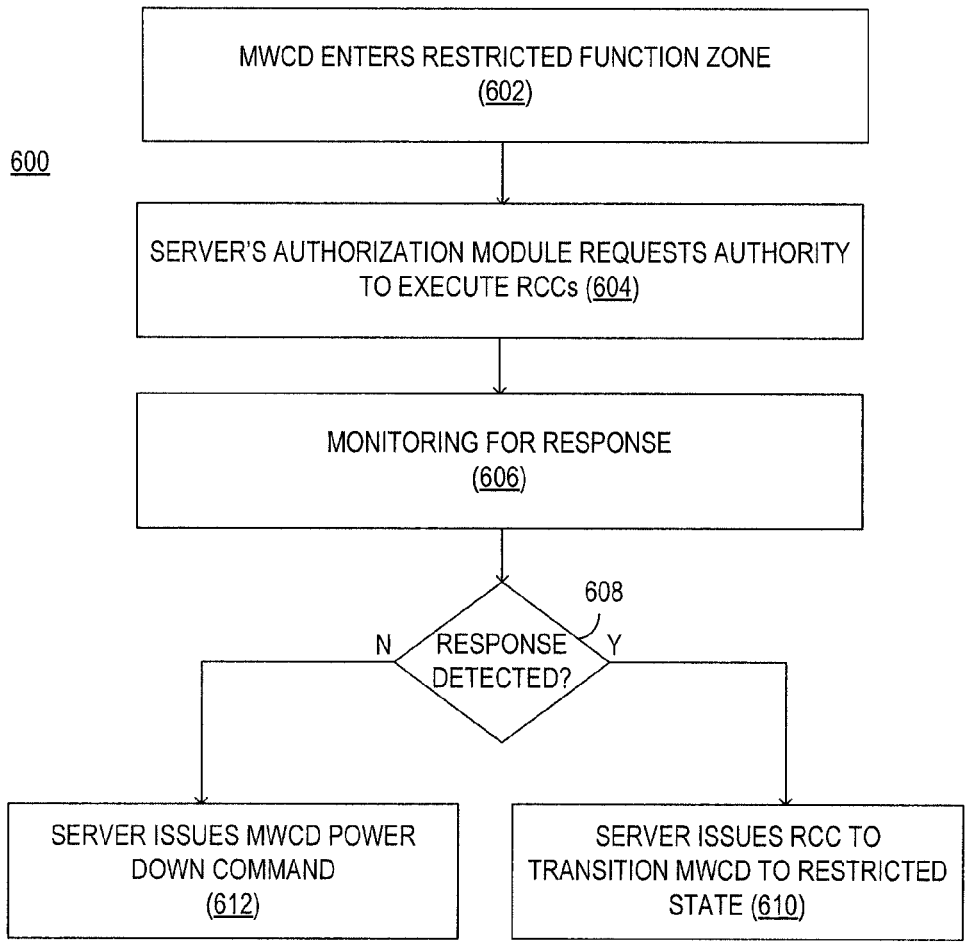
FIG. 6 is a flow diagram of selected elements of a method and service for controlling the recording functionality of a set of mobile and wireless communication devices.

Storage resources 210 and 310 as shown in FIG. 4 and FIG. 5 include modules identified as authorization modules 404 and 504, respectively. In some embodiments, the remote configuration functionality described herein requires affirmative authorization by the user or subscriber to MWCD 120. Referring to FIG. 6, a flow diagram illustrating selected elements of one embodiment of an authorization method 600 suitable for use in authorization module 404 on server storage resource 210 is shown. In this embodiment, authorization module 404 is initiated when an MWCD 120 approaches or enters (block 602) restricted function zone 130. As indicated previously, the boundaries of restricted function zone 130 may be defined in various ways including, as an example, by indicating the GPS coordinates of the physical boundaries explicitly and determining whether an MWCD 120 is located within those boundaries. Alternatively, restricted function zone 130 may be arranged so that there are a limited number of access points. In this embodiment, Bluetooth or other PAN protocols may be employed to identify and communicate authorization information to an MWCD when it enters the restricted function zone 130 through an ingress point located in close proximity to a PAN 135 or other suitable PAN server 136. In a LAN-based embodiment, the LAN 138 may be implemented to substantially coincide with or define the restricted function zone 130.

The server authorization module 404 then requests (block 604) authorization to execute one or more RCCs. The server authorization module then monitors (block 606) for a response. If an affirmative response is detected in block 608, application server 110 issues (block 610) one or more RCCs by wirelessly transmitting the RCC. If application server 110 detects a negative response to the inquiry of block 604, or if a predetermined time limit expires without receiving a response from the MWCD, application server 110 may then issue (block 612) a power down command. In this embodiment, the user or subscriber of MWCD 120 has the option of permitting application server 110 to configure the applicable MWCD's recording and/or other features or power down the device entirely. For example, in one embodiment, all MWCDs 120 that respond affirmatively may be issued a key or code that enables application server 110 to broadcast a power down command selectively to those MWCDs that did not respond affirmatively to the RCC authority request.

The above disclosed subject matter is to be considered illustrative, and not restrictive, and the appended claims are intended to cover all such modifications, enhancements, and other embodiments which fall within the true spirit and scope of the disclosed subject matter. Thus, to the maximum extent allowed by law, the following claims are entitled to the broadest permissible scope.

What is claimed is:

1. A method for managing wireless communication devices, comprising:
    sending an invitation to each of a plurality of wireless communication devices to grant remote configuration authority to a server; and
    responsive to detecting a lack of an affirmative response to the invitation from a first subset of the plurality of wireless communication devices, wirelessly and remotely powering down each of the first subset of wireless communication devices.

2. The method of claim 1, wherein powering down the first subset of wireless communication devices includes transmitting a standard power down command to each of the first subset of wireless communication devices.

3. The method of claim 2, wherein the first subset of wireless communication devices includes at least two different types of wireless communication devices and wherein each of the at least two different types of wireless communication devices responds to the standard power down command.

4. The method of claim 1, wherein the plurality of wireless communication devices comprises wireless communication devices located within a predetermined region and wherein the method includes:
    identifying the wireless communication devices located within the predetermined region.

5. The method of claim 1, further comprising:
    responsive to detecting an affirmative response to the invitation from a second subset of the plurality of wireless communication devices, disabling a predetermined feature on each of the second subset of wireless communication devices.

6. The method of claim 5, wherein disabling the predetermined feature includes wirelessly transmitting a remote configuration command to each of the second subset of wireless communication devices.

7. The method of claim 6, wherein wirelessly transmitting the remote configuration command includes wirelessly transmitting the remote configuration command on a frequency in an open portion of the frequency spectrum.

8. The method of claim 5, wherein the predetermined feature is a recording feature selected from an image recording feature, an audio recording feature, and an audio-video recording feature.

9. The method of claim 5, wherein the predetermined feature is an audio output feature of the wireless communication device.

10. A management server, comprising
a processor;
a computer memory, accessible to the processor, including processor-executable program instructions that, when executed by the processor, cause the processor to perform operations comprising:
sending an invitation to each of a plurality of wireless communication devices to grant remote configuration authority to a server; and
responsive to detecting a lack of an affirmative response from a first subset of the plurality of wireless communication devices, wirelessly and remotely powering down each of the first subset of wireless communication devices.

11. The server of claim 10, wherein powering down the first subset of the plurality of wireless communication devices includes transmitting a standard power down command to each of the first subset of wireless communication devices, wherein the first subset of wireless communication devices includes at least two different types of wireless communication devices, including a first type associated with a first vendor and a second type associated with a second vendor.

12. The server of claim 10, wherein the plurality of wireless communication devices comprises wireless communication devices located within a predetermined region and wherein the operations include:
identifying the wireless communication devices located within the predetermined region.

13. The server of claim 10, wherein the operations include:
responsive to detecting an affirmative response to the invitation from a second subset of the plurality of wireless communication devices, disabling a predetermined feature on each of the second subset of wireless communication devices.

14. The server of claim 13, wherein disabling the predetermined feature includes wirelessly transmitting a remote configuration command to each of the second subset of wireless communication devices.

15. The server of claim 10, wherein the predetermined feature is a recording feature selected from an image recording feature, an audio recording feature, an audio-video recording feature, and an audio output feature.

16. A computer readable memory, including processor executable program instructions that, when executed by the processor, cause the processor to perform operations comprising:
requesting each of a plurality of wireless communication devices to grant remote configuration authority to a server; and
broadcasting a remote power down command to power down a first subset of the plurality of wireless communication devices, wherein the first subset of wireless communication devices includes: wireless communication devices that did not grant remote configuration authority to the server.

17. The computer readable memory of claim 16, wherein powering down the first subset of the plurality of wireless communication devices includes transmitting a standard power down command to each of the first subset of wireless communication devices, wherein the first subset of wireless communication devices includes at least two different types of wireless communication devices, including a first type associated with a first vendor and a second type associated with a second vendor.

18. The computer readable memory of claim 16, wherein the plurality of wireless communication devices comprises wireless communication devices located within a predetermined region and wherein the method includes:
identifying the wireless communication devices located within the predetermined region.

19. The computer readable memory of claim 15, wherein the operations include:
responsive to detecting an affirmative response to the invitation from a second subset of the plurality of wireless communication devices, disabling a predetermined feature on each of the second subset of wireless communication devices.

20. The computer readable memory of claim 19, wherein disabling the predetermined feature includes wirelessly transmitting a remote configuration command to each of the second subset of wireless communication devices.

* * * * *